(12) United States Patent
Wakita et al.

(10) Patent No.: US 10,767,384 B2
(45) Date of Patent: Sep. 8, 2020

(54) SLIDING SEISMIC ISOLATION DEVICE

(71) Applicant: NIPPON STEEL & SUMIKIN ENGINEERING CO., LTD., Tokyo (JP)

(72) Inventors: Naoya Wakita, Tokyo (JP); Koji Nishimoto, Tokyo (JP); Hisami Hasegawa, Tokyo (JP); Shunsuke Kohzuki, Tokyo (JP)

(73) Assignee: NIPPON STEEL & SUMIKIN ENGINEERING CO., LTD., Tokyo (JP)

( * ) Notice: Subject to any disclaimer, the term of this patent is extended or adjusted under 35 U.S.C. 154(b) by 47 days.

(21) Appl. No.: 16/304,206

(22) PCT Filed: Apr. 3, 2018

(86) PCT No.: PCT/JP2018/014305
§ 371 (c)(1),
(2) Date: Nov. 23, 2018

(87) PCT Pub. No.: WO2018/207503
PCT Pub. Date: Nov. 15, 2018

(65) Prior Publication Data
US 2020/0141148 A1 May 7, 2020

(30) Foreign Application Priority Data
May 10, 2017 (JP) .................. 2017-094105

(51) Int. Cl.
*E04H 9/02* (2006.01)
*E04B 1/36* (2006.01)
*E04B 1/98* (2006.01)

(52) U.S. Cl.
CPC .............. *E04H 9/022* (2013.01); *E04B 1/36* (2013.01); *E04B 1/98* (2013.01)

(58) Field of Classification Search
CPC E04H 9/022; E04H 9/02; E04H 9/021; E04H 9/028; E04H 9/027; E04B 1/36; E04B 1/98
(Continued)

(56) References Cited

U.S. PATENT DOCUMENTS 4,499,694 A * 2/1985 Buckle ...................... E04B 1/98
52/167.7
5,597,240 A * 1/1997 Fyfe ...................... E01D 19/041
14/73.5
(Continued)

FOREIGN PATENT DOCUMENTS

EP 2873883 5/2015
JP H11-062312 3/1999
(Continued)

OTHER PUBLICATIONS

International Search Report dated Jun. 19, 2018 with respect to PCT/JP2018/014305.

*Primary Examiner* — Brian E Glessner
*Assistant Examiner* — Adam G Barlow
(74) *Attorney, Agent, or Firm* — IPUSA, PLLC

(57) ABSTRACT

A sliding seismic isolation device includes an upper shoe and a lower shoe, the upper and lower shoes having sliding surfaces, and the sliding surfaces having curvatures; and a columnar steel slider disposed between the upper and lower shoes, the slider having an upper surface and a lower surface that are in contact with the upper and lower shoes, respectively, and have curvatures. A double-woven fabric layer is attached to each of the upper and lower surfaces of the slider via an adhesive layer, the double-woven fabric layer containing PTFE fibers and fibers with higher tensile strength than that of the PTFE fibers, and the PTFE fibers being arranged on sides of the sliding surfaces of the upper and lower shoes. A fluorine coat layer is disposed on a surface of
(Continued)

the double-woven fabric layer, and a lubricating oil layer is disposed on a surface of the fluorine coat layer.

5 Claims, 6 Drawing Sheets

(58) Field of Classification Search
USPC .................. 52/167.1, 167.4, 167.7–167.9
See application file for complete search history.

(56) References Cited

U.S. PATENT DOCUMENTS

| | | | | |
|---|---|---|---|---|
| 6,021,992 | A * | 2/2000 | Yen | E04H 9/021 248/560 |
| 6,289,640 | B1 * | 9/2001 | Ueda | E04H 9/022 52/167.4 |
| 6,688,051 | B2 * | 2/2004 | Tsai | E01D 19/04 248/636 |
| 8,973,887 | B2 * | 3/2015 | Nakata | F16C 23/045 248/562 |
| 9,175,468 | B1 * | 11/2015 | Tsai | E01D 19/046 |
| 9,435,087 | B2 * | 9/2016 | Kim | F16C 13/04 |
| 2005/0241245 | A1 * | 11/2005 | Tsai | E04H 9/023 52/167.1 |
| 2006/0174555 | A1 * | 8/2006 | Zayas | E04H 9/023 52/167.4 |
| 2008/0098671 | A1 * | 5/2008 | Tsai | E04H 9/023 52/167.6 |
| 2008/0222975 | A1 * | 9/2008 | Nakata | E04H 9/022 52/167.9 |
| 2010/0095608 | A1 * | 4/2010 | Marioni | E04H 9/023 52/167.4 |
| 2011/0227265 | A1 * | 9/2011 | Fujita | E04H 9/021 267/140.13 |
| 2012/0174500 | A1 * | 7/2012 | Yakoub | E04B 1/98 52/167.4 |
| 2016/0215495 | A1 * | 7/2016 | Nakamura | E04H 9/0215 |
| 2019/0316376 | A1 * | 10/2019 | Aujaghian | E04B 1/98 |

FOREIGN PATENT DOCUMENTS

| | | |
|---|---|---|
| JP | 4848889 | 12/2011 |
| JP | 5521096 | 6/2014 |

* cited by examiner

FIG.4

| | EMBODIMENT | COMPARATIVE EXAMPLE 1 | COMPARATIVE EXAMPLE 2 | COMPARATIVE EXAMPLE 3 |
|---|---|---|---|---|
| LUBRICATING OIL TYPE | | SILICONE OIL | | SILICONE GREASE |
| 25 °C KINETIC VISCOSITY (mm²/s) | 1,000 | 5,000 | 30,000 | EQUAL TO OR MORE THAN 30,000 |
| STATE OF SLIDER SURFACE AFTER REPEATED DURABILITY TEST | | | | |
| REMARKS | NO DAMAGE | BREAK (DAMAGE) AT THE END | BREAK (DAMAGE) IN SLIDING DIRECTION | BREAK (DAMAGE) AT EARLY STAGE |
| RESULT OF REPEATED DURABILITY EVALUATION | GOOD | NO GOOD | NO GOOD | NO GOOD |

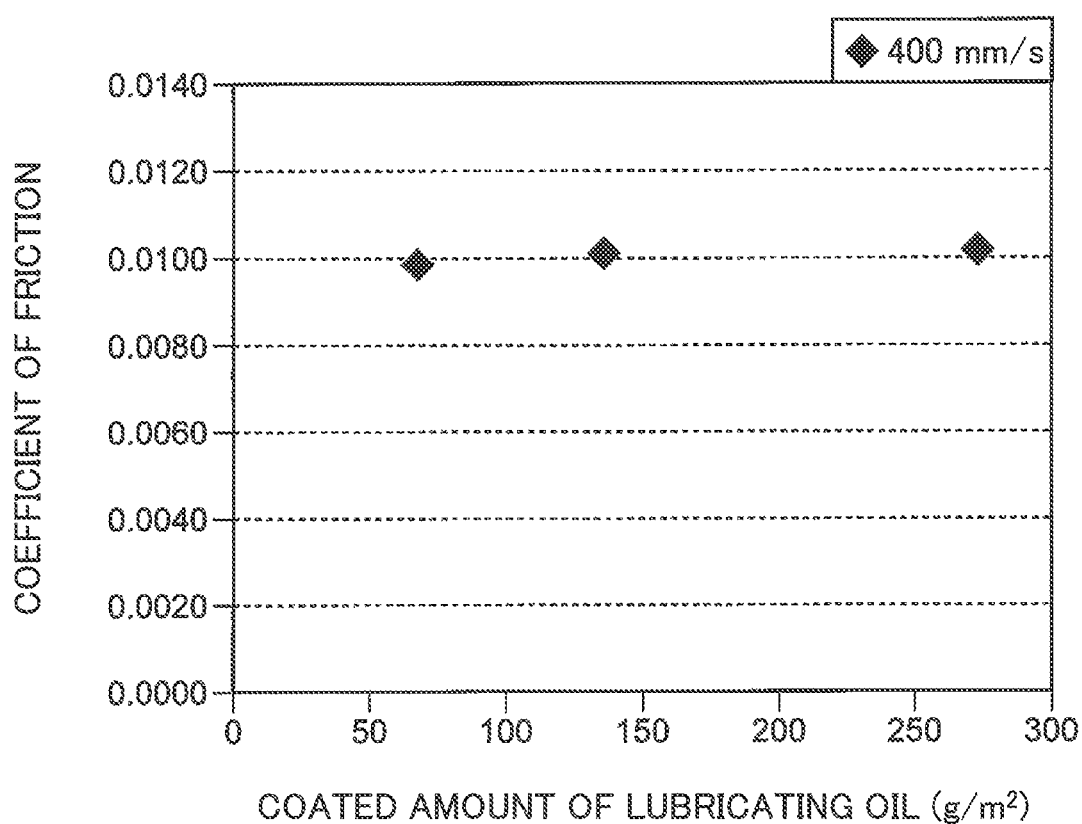

SLIDING SEISMIC ISOLATION DEVICE

BACKGROUND OF THE INVENTION

1. Field of the Invention

The present invention relates to a sliding seismic isolation device including upper and lower shoes and a slider interposed between them.

2. Description of the Related Art

In Japan, which is an earthquake-prone country, a variety of quake resistant techniques, seismic isolation techniques, and vibration control techniques, such as techniques against seismic force and techniques for reducing seismic force on buildings, have been developed for a variety of constructions, such as buildings, bridges, elevated roads, and single-family houses, and have been applied to a variety of constructions.

In particular, seismic isolation techniques, which are the techniques for reducing seismic force on constructions, can effectively reduce vibrations in constructions when earthquakes occur. According to the seismic isolation techniques, a seismic isolation device is provided between a base, which is a lower structure, and an upper structure so that transmission of vibration of the base, which occurs due to an earthquake, to the upper structure is reduced and vibration of the upper structure is thus reduced. Thus, structure stability is ensured. Such a seismic isolation device is effective not only when an earthquake occurs but also for reducing the influence of traffic vibration, which is always being applied to the construction, on the upper structure.

Examples of seismic isolation devices include devices with a variety of configurations, such as a lead plug-containing laminated rubber bearing device, a high damping laminated rubber bearing device, a device that combines a laminated rubber bearing and a damper, and a sliding seismic isolation device. Above all, the sliding seismic isolation device will be exemplarily described with reference to its general structure. A sliding seismic isolation device typically includes upper and lower shoes each having a sliding surface with a curvature, a columnar slider interposed between the upper and lower shoes and having upper and lower surfaces that are in contact with and have the same curvatures as the upper and lower shoes, respectively. Such a sliding seismic isolation device is also referred to as a seismic isolation device with slidable upper and lower spherical surfaces or a double-concave seismic isolation device.

In this type of seismic isolation device, the operation performance of the upper and lower shoes is dominated by the coefficient of friction between the upper and lower shoes and the slider interposed between them or by frictional force that corresponds to the coefficient of friction multiplied by the weight. It should be noted that, in the conventional sliding seismic isolation device, the reference contact pressure of a slider is less than or equal to 20 MPa. Therefore, when the weight of a construction is increased by an increase in the height thereof or the like, there is no way other than increasing the size of the sliding seismic isolation device correspondingly so that the device has planar dimensions that can withstand the load of the construction. This results in lower cost-competitiveness of the device in comparison with other types of seismic isolation devices, such as laminated rubber seismic isolation devices, which is a problem.

Here, Patent Document 1 discloses a high-performance sliding seismic isolation device with a slider whose contact pressure is 60 MPa. Specifically, the sliding seismic isolation device includes a columnar steel slider, a double-woven fabric layer is attached to each of the upper and lower surfaces of the slider, the double-woven fabric layer contains PTFE fibers and fibers with higher tensile strength than that of the PTFE fibers, and the PTFE fibers are provided at positions on the sides of the sliding surfaces of the upper and lower shoes.

CITATION LIST

[Patent Document]
[Patent Document 1] Japanese Patent Specification No. 5521096

SUMMARY OF THE INVENTION

Technical Problem

In the sliding seismic isolation device disclosed in Patent Document 1, a steel slider is used to maintain high contact pressure of the slider, and a double-woven fabric layer is provided on each of the upper and lower surfaces of the slider that are in contact with the sliding surfaces of the upper and lower shoes. More specifically, a double-woven fabric layer, which contains PTFE fibers and fibers with higher tensile strength than that of the PTFE fibers, is fixed on the body of the slider such that the PTFE fibers are arranged on the sides of the sliding surfaces, whereby it is possible to provide a sliding seismic isolation device with high seismic isolation performance while ensuring a contact pressure of 60 MPa.

It should be noted that, according to the inventors, a coefficient of friction of the sliding seismic isolation device disclosed in Patent Document 1 is identified to be about 4%. It can be said that, from a view point of seismic isolation performance, about 4% of a coefficient of friction is sufficiently superior as a sliding seismic isolation device. However, today, with respect to such buildings as hospitals or welfare facilities that require the building response to an earthquake to be as small as possible, the response acceleration at the time of earthquake based on a coefficient of friction of about 4% is still too large, and thus, further decrease of the response acceleration is required particularly for such facilities.

It is identified by the inventors that the coefficient of friction of a sliding seismic isolation device that should satisfy the above-described requirements is equal to or less than 3%, preferably, 2%. It should be noted that, in the case where the coefficient of friction is equal to or less than 3%, the building response acceleration for an earthquake ground motion of level 2 can be suppressed to be equal to or less than 300 gal, which is also identified by the inventors.

The present invention has been made in view of the above problem. An object of the present invention is to provide a sliding seismic isolation device that can realize high durability and lower friction characteristics.

Solution to Problem

In order to achieve the object, the sliding seismic isolation device in accordance with the present invention includes an upper shoe and a lower shoe, the upper and lower shoes each having a sliding surface with a curvature; and a columnar steel slider disposed between the upper and lower shoes, the slider having an upper surface and a lower surface that are in contact with the upper and lower shoes, respectively, and have curvatures. A double-woven fabric layer is attached to each of the upper and lower surfaces of the slider via an adhesive layer, the double-woven fabric layer containing PTFE fibers and fibers with higher tensile strength than that of the PTFE fibers, and the PTFE fibers being arranged on sides of the sliding surfaces of the upper and lower shoes. A fluorine coat layer is disposed on a surface of the double-woven fabric layer, and a lubricating oil layer is disposed on a surface of the fluorine coat layer.

The sliding seismic isolation device according to an embodiment of the present invention relates to a sliding seismic isolation device in which double-woven fabric layers including PTFE fibers are attached to upper and lower surfaces of a steel slider included in the device via adhesive layers. The device is characterized by having fluorine coat layers provided on the surfaces of the double-woven fabric layers and by having lubricating oil layers provided on the surfaces of the fluorine coat layers. Yet further lower friction characteristics can be achieved by having the lubricating oil layers above the surfaces of the double-woven fabric layers via the fluorine coat layers, and high durability can be achieved because the adhesive characteristics of the double-woven fabric layers with respect to the slider are not degraded by the lubricating oil.

As a measure for realizing the yet further lower friction characteristics of the sliding seismic isolation device, directly applying the lubricating oil to the surfaces of the double-woven fabric layers can be considered. However, in the case where the lubricating oil is simply directly applied to the surfaces of the double-woven fabric layers (in the case where the lubricating oil layers are provided directly on the surfaces of the double-woven fabric layers), the applied lubricating oil permeates an interface between the double-woven fabric layers and the adhesive layers, and the adhesive strength of the double-woven fabric layers to the slider is reduced due to the lubricating oil that has permeated the interface. As a result, the double-woven fabric layers tend to be separated from the adhesive layers, which leads to an early damage of the double-woven fabric layers, which is identified by the inventors.

Here, regarding the forming of the fluorine coat layers, the fluorine coat layers can be formed by using a solution generated by dissolving a fluororesin in a nonflammable fluorinated solvent or organic solvent, and by: applying the solution to the surfaces of the double-woven fabric layers and drying them; dipping the surfaces of the double-woven fabric layers into the solution and drying them; or spraying the solution onto the surfaces of the double-woven fabric layers and drying them.

In a sliding seismic isolation device according to an embodiment of the present invention, the lubricating oil layers are provided on the surfaces of the fluorine coat layers formed on the surfaces of the double-woven fabric layers. It can be easily considered that, when the lubricating oil layers are provided on the surfaces of the fluorine coat layers that have good water repellency, the lubricating oil layers are repelled by the fluorine coat layers, and the fluorine coat layers and the lubricating oil layers cannot maintain the layered structure. In other words, it can be said that the structure in which the lubricating oil layers are provided on the surfaces of the fluorine coat layers is a structure that cannot be normally considered based on the conventional knowledge.

However, in a sliding seismic isolation device according to an embodiment of the present invention, the fluorine coat layers are provided on the surfaces of the double-woven fabric layers. There is unevenness on the surfaces of the double-woven fabric layers because they are made of fabric. Therefore, when the fluorine coat layers are provided on the uneven surfaces, a part of the fluorine coat layers goes into the unevenness of the surfaces of the double-woven fabric layers, and the fluorine coat layers themselves have unevenness. Further, when the lubricating oil layers are provided with respect to the uneven fluorine coat layers, a part of the lubricating oil layers goes into the unevenness of the fluorine coat layers, and, according to what is referred to as "anchoring effect", the lubricating oil layers can be maintained to be fixed to the fluorine coat layers. Furthermore, in addition to the above, the lubricating oil layers are strongly fixed to the fluorine coat layers because the lubricating oil layers and the fluorine coat layers receive high contact pressure due to the building weight in the real world. As described above, by applying an innovative idea of providing the lubricating oil layers on the surfaces of the fluorine coat layers, it is possible to realize further lower friction characteristics of the sliding seismic isolation device using the lubricating oil layers while effectively preventing the lubricating oil from permeating the interface between the double-woven fabric layers and the adhesive layers.

Here, silicone oil layers can be applied as the lubricating oil layers. It is verified by the inventors that, as a result of a repetition endurance test of the sliding seismic isolation device using various silicone oils and silicone greases for the lubricating oil layers, the silicone oil is preferable for the lubricating oil layers, and, in the case where the 25° C. kinetic viscosity of the silicone oil is equal to or less than 1000 mm$^2$/sec, the double-woven fabric layers are not readily damaged and high durability of the sliding seismic isolation device can be realized. It should be noted that it is confirmed by the inventors that the shear force that is applied to the double-woven fabric layers tends to increase and the durability of the double-woven fabric layers tend to decrease, as the 25° C. kinetic viscosity increases exceeding 1000 mm$^2$/sec.

It should be noted that, in a sliding seismic isolation device according to an embodiment of the present invention, while ensuring the high contact pressure by using the steel slider, a double-woven fabric layer, which contains PTFE fibers and fibers with higher tensile strength than that of the PTFE fibers, is provided on each of the upper and lower surfaces of the slider that are in contact with sliding surfaces of the upper and lower shoes such that the PTFE fibers are arranged on the sides of the sliding surfaces of the upper and lower shoes. According to the above arrangement, it is possible for the sliding seismic isolation device to have high seismic isolation performance while ensuring the contact pressure of 60 MPa. In other words, as the PTFE fibers are arranged on the upper and lower surfaces of the slider on the sides of the sliding surfaces of the upper and lower shoes, it is possible to provide high slidability under a high contact pressure of about 60 MPa. Further, when a double-woven fabric layer containing PTFE fibers is applied, the PTFE fibers that have relatively low tensile strength and thus have low squash resistance when subjected to a load, are easily squashed when subjected to repetitive vibrations (i.e., pressure sliding force) in the pressed state. However, the squashed PTFE fibers remain in the fibers that have relatively higher tensile strength than that of the PTFE fibers and thus have higher squash resistance, at least some of the PTFE fibers can face the sliding surfaces of the upper and lower shoes. Thus, excellent slidability of the PTFE fibers can be provided. This leads to an improvement of the durability of the sliding seismic isolation device with desired seismic isolation performance.

It should be noted that examples of the "fibers with higher tensile strength than that of the PTFE fibers" include a variety of resin fibers, such as nylon 6 and polyethylene terephthalate (PET). In particular, PPS fibers with excellent chemical resistance and hydrolysis resistance as well as extremely high tensile strength are desirably used. The body of the steel slider and the double-woven fabric layers are bonded and fixed to each other with an adhesive. For example, when PPS fibers are used as the fibers with higher tensile strength than that of the PTFE fibers are used. Thus, it is advantageous to apply double-woven fabric layers such that the PTFE fibers are arranged on the sides of the sliding surfaces of the shoes and the PPS fibers and the like are arranged on the side of the body of the slider.

Advantageous Effects of Invention

As will be understood from the above descriptions, according to a sliding seismic isolation device of the present invention, with respect to the sliding seismic isolation device in which the double-woven fabric layers including the PTFE fibers are attached to the upper and lower surfaces of the steel slider via the adhesive layers, further lower friction characteristics are realized by applying a structure in which the lubricating oil layers are provided on the surfaces of the double-woven fabric layers via the fluorine coat layers, and, it is possible to prevent the lubricating oil from permeating the interface between the double-woven fabric layers and the adhesive layers and it is possible to realize high durability because the adhesive characteristics of the double-woven fabric layers with respect to the slider are not degraded.

BRIEF DESCRIPTION OF THE DRAWINGS

FIG. 4 is a drawing illustrating, with respect to repetition durability results, the test results when fluorine coat layers are changed.

FIG. 5A is a drawing illustrating, with respect to repetition durability results, the identified results of coefficients of friction when an application amount of the lubricating oil layers is changed in the case where the sliding speed of the slider is 400 mm/sec.

DETAILED DESCRIPTION OF THE PREFERRED EMBODIMENTS

Figure 1:
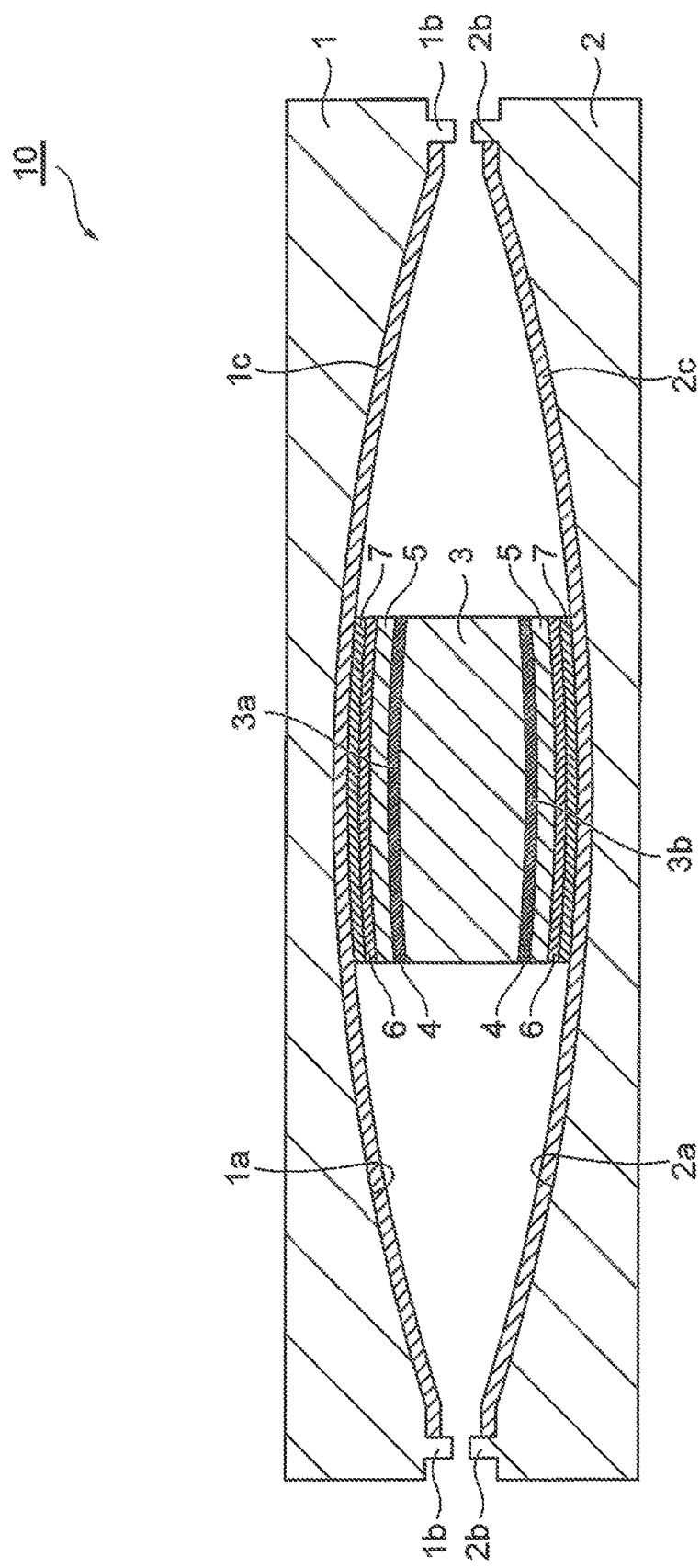
FIG. 1 is a longitudinal sectional view of an embodiment of a sliding seismic isolation device of the present invention.

In the following, referring to the drawings, an embodiment of a sliding seismic isolation device of the present invention will be described. It should be noted that the sliding seismic isolation device illustrated in an example of the drawing includes a silicone oil layer as the lubricating oil layer. However, the layer may be a layer made of material other than the silicone oil as long as the 25° C. kinetic viscosity of the material is the same as that of the silicone oil layer.

Embodiment of Sliding Seismic Isolation Device

Figure 2:
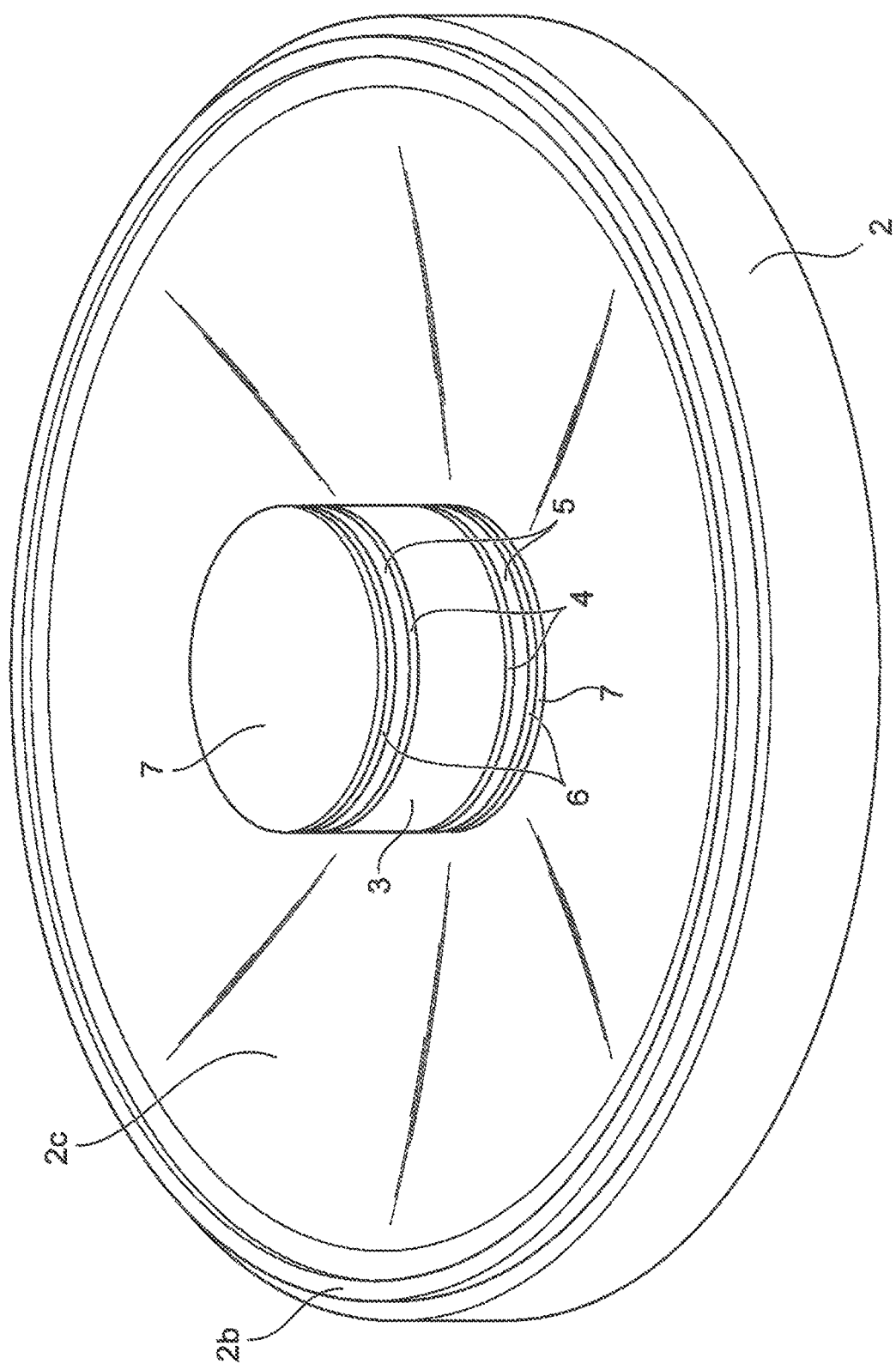
FIG. 2 is a perspective view of the sliding seismic isolation device seen obliquely from above while an upper shoe is removed.
Figure 3:
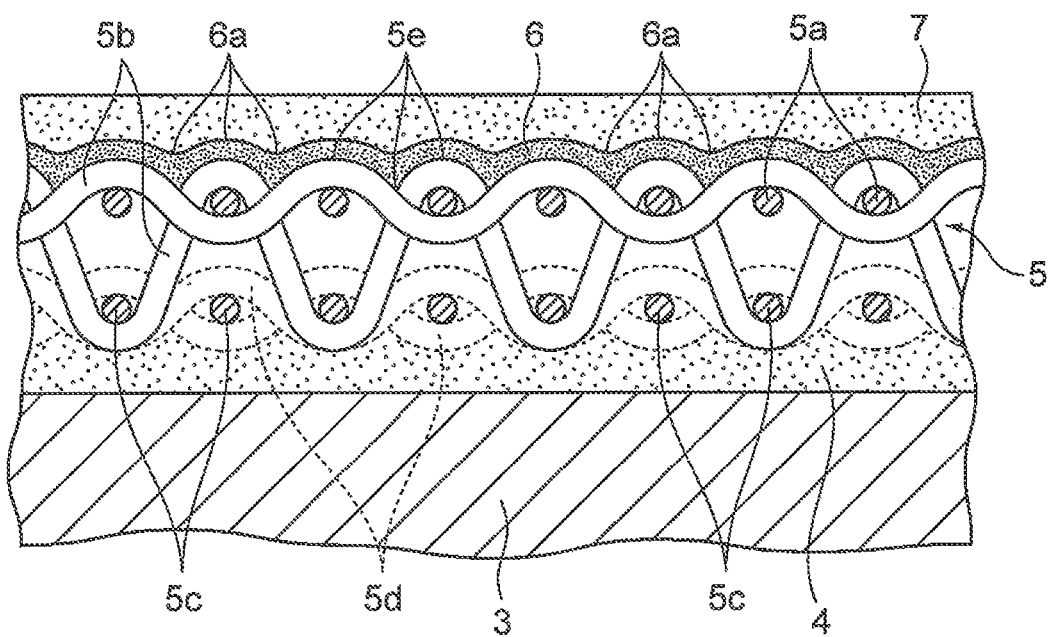
FIG. 3 is a schematic view illustrating the structure of a double-woven fabric layer in which a lubricating oil layer, a fluorine coat layer, a double-woven fabric layer, and an adhesive layer are enlarged.

FIG. 1 is a longitudinal sectional view of an embodiment of a sliding seismic isolation device of the present invention. FIG. 2 is a perspective view of the sliding seismic isolation device seen obliquely from above while an upper shoe is removed. FIG. 3 is a schematic view illustrating the structure of a double-woven fabric layer in which a lubricating oil layer, a fluorine coat layer, a double-woven fabric layer, and an adhesive layer are enlarged.

A sliding seismic isolation device 10 illustrated in the drawing generally includes an upper shoe 1 that includes a lower sliding surface 1c made of SUS with a curvature on the inner side of an lower surface 1a of the upper shoe 1, a lower shoe 2 that includes an upper sliding surface 2c made of SUS with a curvature on the inner side of an upper surface 2a of the lower shoe 2, and a columnar slider 3 made of steel (including SUS) having an upper surface 3a and a lower surface 3b with a curvature that are in contact with the upper shoe 1 and the lower shoe 2, respectively.

In the lower surface 1a of the upper shoe 1, a ring-shaped stopper 1b is provided surrounding the lower sliding surface 1c. In the upper surface 2a of the lower shoe 2, a ring-shaped second stopper 2b is provided surrounding the upper sliding surface 2c. According to the ring-shaped stoppers 1b and 2b, a sliding range of the slider 3 is defined and the slider 3 is prevented from dropping out.

Each of the upper and lower shoes 1 and 2 and the slider 3 is formed of rolled steel for welding (SM490A,B,C, SN490B,C, or S45C), and has a load bearing strength with a contact pressure of 60 MPa.

The upper surface 3a and the lower surface 3b of the slider 3 respectively have double-woven fabric layers 5 that are fixed thereon by adhesion via adhesive layers 4 made of epoxy resin adhesive.

As illustrated in FIG. 3 in detail, the double-woven fabric layers 5 are formed by PTFE fibers 5a and 5b and PPS fibers 5c and 5d whose tensile strength is higher than that of the PTFE fibers. The double-woven fabric layers 5 are fixed to the slider 3 such that the PTFE fibers 5a and 5b are respectively arranged on the sides of the sliding surfaces 1a and 2a of the upper shoe 1 and the lower shoe 2.

Here, examples of the "fibers with higher tensile strength than that of the PTFE fibers" illustrated in the figure include PPS fibers 5c and 5d. In addition, the "fibers with higher tensile strength than that of the PTFE fibers" include fibers of polyamide such as nylon 6,6, nylon 6, or nylon 4,6, polyester such as polyethylene terephthalate (PET), polytrimethylene terephthalate, polybutylene terephthalate, or polyethylene naphthalate, paraaramid, meta-aramid, polyethylene, polypropylene, glass, carbon, LCP, polyimide, or PEEK. Alternatively, fibers such as thermal bonding fibers, cotton, or wool may also be applied. Above all, PPS fibers with excellent chemical resistance and hydrolysis resistance as well as extremely high tensile strength are desirably used. Therefore, PPS fibers 5c and 5d are applied in examples illustrated in the figure.

In the structure of the double-woven 5 shown in FIG. 3, weft threads 5c of PPS fibers are arranged on the side of the slider 3, and warp threads 5d of PPS fibers are woven such that the weft threads 5c are woven into the warp threads 5d.

Weft threads 5a of PTFE fibers are arranged above the weft threads 5c and the warp threads 5d (at the position on the shoe side), and the warp threads 5b of PTFE fibers are woven such that the weft threads 5a are woven into the warp threads 5b. Thus, the PTFE fibers are arranged on the sides of the sliding surfaces 1a and 2a of the upper shoe 1 and the lower shoe 2, thereby forming the upper and lower double-woven fabric layers 5.

As the PPS fibers 5c and 5d have significantly higher adhesion to the surface of the steel slider 3 than the PTFE fibers 5a and 5b, it would be advantageous to apply the double-woven fabric layers 5 such that the PTFE fibers 5a and 5b are arranged on the sides of the sliding surfaces 1a and 2a of the upper shoe 1 and the lower shoe 2, and the PPS fibers 5c and 5d are arranged on the side of the slider 3.

In addition, as the PTFE fibers 5a and 5b have relatively low tensile strength, such fibers are easily squashed when subjected to repetitive vibrations (i.e., pressure sliding force) in the state in which the double-woven fabric layers 5 are pressed. However, the squashed PTFE fibers 5a and 5b remain in the PPS fibers 5c and 5d that have relatively higher tensile strength than that, of the PTFE fibers 5a and 5b and thus have higher squash resistance, at least some of the PTFE fibers 5a and 5b can face the sliding surfaces 1a and 2a of the upper and lower shoes 1 and 2. Thus, excellent slidability of the PTFE fibers 5a and 5b can be provided.

Fluorine coat layers 6 are further provided on the surfaces of the double-woven fabric layers 5 that are attached to the upper surface 3a and the lower surface 3b of the slider 3 via the adhesive layers 4, and lubricating oil layers 7 are further provided on the surfaces of the fluorine coat layers 6.

The fluorine coat layers 6 can be formed by using a solution generated by dissolving a fluororesin in a nonflammable fluorinated solvent, or the like, and by spraying the solution onto the surfaces of the double-woven fabric layers 5 and drying them.

With respect to the above, the lubricating oil layers 7 are silicone oil layers. "KF-96" produced by Shin-Etsu Chemical Co., Ltd., can be used as the silicone oil of the silicone oil layer. The "KF-96" is a dimethyl silicone oil. There are various types in the "KF-96". The "KF-96" covers a wide range of 25° C. kinetic viscosity from the 25° C. kinetic viscosity that is less than 1000 $mm^2$/sec to the 25° C. kinetic viscosity that is equal to or greater than 30000 $mm^2$/sec. The lubricating oil layers 7 are formed by applying a predetermined amount of lubricating oil to the fluorine coat layers 6 using a spatula.

According to an experiment by the inventors described below, it has been verified that a sliding seismic isolation device 10 with extremely high durability is obtained by using silicone oil layers whose 25° C. kinetic viscosity is equal to or less than 1000 $mm^2$/sec to reduce the damage of the double-woven fabric layers 5. Therefore, a sliding seismic isolation device 10 including silicone oil layers 7 with the 25° C. kinetic viscosity that is equal to or less than 1000 $mm^2$/sec can be listed as an desirable embodiment.

With respect to a structure in which the lubricating oil layers 7 are provided on surfaces of the fluorine coat layers 6 that are formed on the surfaces of the double-woven fabric layers 5, it can be easily considered that, when the lubricating oil layers are provided on the surfaces of the fluorine coat layers that have good water repellency, the lubricating oil layers 7 are repelled by the fluorine coat layers, and the layered structure of the fluorine coat layers 6 and the lubricating oil layers 7 cannot be maintained. However, in a sliding seismic isolation device 10 illustrated in the drawing, the fluorine coat layers 6 are provided on the surfaces of the double-woven fabric layers 5. As illustrated in FIG. 3, there is unevenness 5e on the surfaces of the double-woven fabric layers 5 because they are made of fabric. Therefore, when the fluorine coat layers 6 are provided on the surfaces of unevenness 5e, a part of the fluorine coat layers 6 goes into the unevenness 5e of the surfaces of the double-woven fabric layers 5, and the fluorine coat layers 6 themselves have unevenness 6a. Further, when the lubricating oil layers 7 are provided with respect to the fluorine coat layers 6 with unevenness 6a, a part of the lubricating oil layers 7 goes into the unevenness 6a of the fluorine coat layers 6, and, according to what is referred to as "anchoring effect", the lubricating oil layers 7 can be maintained to be fixed to the fluorine coat layers 6. It should be noted that, in addition to the above, the lubricating oil layers 7 are strongly fixed to the fluorine coat layers 6 because the lubricating oil layers 7 and the fluorine coat layers 6 receive high contact pressure due to the weight of a building (not shown) in the real world.

It is possible for a sliding seismic isolation device 10 to realize further lower friction characteristics by a structure in which the lubricating oil layers 7 are provided on the surfaces of the double-woven fabric layers 6 via the fluorine coat layers 6. With respect to the lower friction characteristics, it is possible to realize a friction coefficient of approximately 1% in a state where the contact pressure 60 MPa is being applied and the continuous sliding distance of the slider 3 being 120 m (the continuous sliding distance is typically about 20 m in a single instance of a big earthquake (earthquake level 2)).

Further, by having the fluorine coat layers 6 provided between the double-woven fabric layers 5 and the lubricating oil layers 7, it is possible to solve a problem in the case of applying the lubricating oil to the surface of the double-woven fabric layer. In other words, in a structure in which the lubricating oil is applied directly to the surface of the double-woven fabric layer (a structure in which the lubricating oil layer is provided directly on the surface of the double-woven fabric layer), the applied lubricating oil permeates the interface between the double-woven fabric layer and the adhesive layer, and the adhesive strength of the double-woven fabric layer adhered to the slider is lowered due to the lubricating oil that has permeated the interface. As a result, the double-woven fabric layer can be easily separated from the adhesive layer, which may lead to an early-stage damage of the double-woven fabric layer. With respect to the above, in a sliding seismic isolation device 10, as a result of having the fluorine coat layers 6 provided between the double-woven fabric layers 5 and the lubricating oil layers 7, the lubricating oil is prevented from permeating the interface, the strong adhesive characteristics of the double-woven fabric layers 5 with respect to the slider 3 are achieved, and the high durability of the sliding seismic isolation device 10 is realized.

(Repetition Durability Test for Devices Having Fluorine Coat Layers with Different Kinetic Viscosities, and Results Thereof)

The inventors produced multiple sliding seismic isolation devices having fluorine coat layers made of various materials with different 25° C. kinetic viscosities, and conducted repetition durability tests in which the sliding seismic isolation devices are in a state in which the contact pressure 60 MPa is being applied, and the slider is caused to slide from side to side for continuous 120 m. After the tests, presence or absence of damage of the double-woven fabric layers of the surfaces of the slider is observed, and, in the case where the damage is present, specific states of the damage are observed.

In the tests (experiments), a device according to an embodiment of the present invention has fluorine coat layers with the 25° C. kinetic viscosity of 1000 mm²/sec, a device according to a comparative example 1 has fluorine coat layers with the 25° C. kinetic viscosity of 5000 mm²/sec, a device according to a comparative example 2 has fluorine coat layers with the 25° C. kinetic viscosity of 30000 mm²/sec, and a device according to a comparative example 3 has, not a silicone oil, but a silicone grease whose 25° C. kinetic viscosity is unknown (but is known to be equal to or greater than 30000 mm²/sec). Results of the experiment are illustrated in FIG. 4.

Referring to FIG. 4, it has been observed that there was no damage in the double-woven fabric layers on the surfaces of the slider according to an embodiment of the present invention, and that the sliding seismic isolation device was able to be continued to be used after the continuous sliding distance 120 m of the slider under a state in which the contact pressure 60 MPa was applied.

On the other hand, in a comparative example 1, it has been observed that there was damage at the end of the double-woven fabric layers on the surfaces of the slider, and that the sliding seismic isolation device was unable to be continued to be used. According to the results of an embodiment and a comparative example 1, it has been verified that it is preferable that the 25° C. kinetic viscosity of the fluorine coat layers is equal to or less than 1000 mm²/sec.

Further, in a comparative example 2, it has been observed that there was damage in the sliding direction of the slider in the double-woven fabric layers on the surfaces of the slider, and that the sliding seismic isolation device was unable to be continued to be used. It has been verified that the 25° C. kinetic viscosity, 30000 mm²/sec, of the fluorine coat layers is too high as the viscosity.

According to the results of an embodiment, a comparative example 1 and a comparative example 2, it has been verified that it is preferable that the 25° C. kinetic viscosity of the fluorine coat layers is equal to or less than 1000 mm²/sec and a range that exceeds 5000 mm²/sec is not acceptable.

With respect to the above, in a comparative example 3, the 25° C. kinetic viscosity is equal to or greater than 30000 mm²/sec because the fluorine coat layers are formed by a silicone grease. As a result, it has been confirmed that there was damage in the double-woven fabric layers at an early stage before the continuous sliding distance reaches 120 m.

(Repetition Durability Test for Devices Having Lubricating Oil Layers with Different Amounts of Applied Oil, and Results Thereof)

Figure 5B:
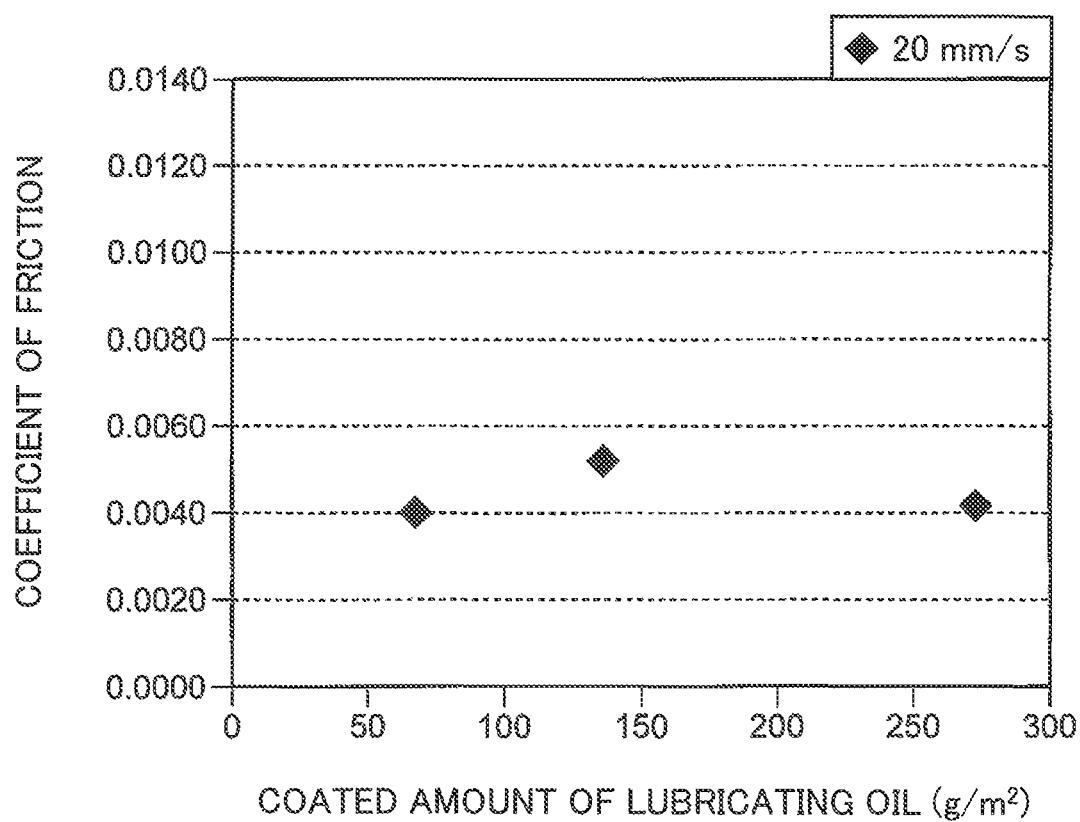
FIG. 5B is a drawing illustrating, with respect to repetition durability results, the identified results of coefficients of friction when an application amount of the lubricating oil layers is changed in the case where the sliding speed of the slider is 20 mm/sec.

The inventors has further produced multiple sliding seismic isolation devices having lubricating oil layers with different applied amounts (with three different applied amounts: 68 g/m2, 136 g/m2, 272 g/m2), conducted repetition durability tests of causing the slider to slide from side to side for continuous 120 m, under conditions in which: the contact pressure 60 MPa is being applied to each of the sliding seismic isolation devices; and ambient temperature is 21° C. to 24° C., and identified the friction coefficient of each of the sliding seismic isolation devices. It should be noted that, the tests have been conducted with two types of sliding speed of the slider, 400 mm/sec and 20 mm/sec. FIG. 5A illustrates test results in the case where the sliding speed of the slider is 400 mm/sec, and FIG. 5B illustrates test results in the case where the sliding speed of the slider is 20 mm/sec.

Referring to FIG. 5A and FIG. 5B, in any one of the sliding seismic isolation devices with respective applied amounts of lubricating oil layers, the fiction coefficient of the device is 0.4% to 1%, which is extremely low, and thus, the effects of having lubricating layers have been confirmed.

Although the embodiments of the present invention have been described in detail with reference to the drawings, specific structures are not limited thereto. Thus, any design changes and the like that may occur within the spirit and scope of the present invention all fall within the scope of the present invention.

DESCRIPTION OF THE REFERENCE NUMERALS

1 Upper shoe (shoe),
1a Lower surface,
1b Stopper,
1c Lower sliding surface (sliding surface),
2 Lower shoe (shoe),
2a Upper surface,
2b Stopper,
2c Upper sliding surface (sliding surface),
3 Slider,
3a Upper surface,
3b Lower surface,
4 Adhesive layer,
5 Double-woven fabric layer,
5a Weft threads of PTFE fibers (PTFE fibers),
5b Warp threads of PTFE fibers (PTFE fibers),
5c Weft threads of PPS fibers (PPS fibers),
5d Warp threads of PSS fibers (PPS fibers),
5e Unevenness,
6 Fluorine coat layer,
6a Unevenness,
7 Lubricating oil layer (silicone oil layer),
10 Sliding seismic isolation device

What is claimed is:

1. A sliding seismic isolation device comprising:
an upper shoe and a lower shoe, the upper and lower shoes each having a sliding surface with a curvature; and
a columnar steel slider disposed between the upper and lower shoes, the slider having an upper surface and a lower surface that are in contact with the upper and lower shoes, respectively, and have curvatures, wherein
a double-woven fabric layer is attached to each of the upper and lower surfaces of the slider via an adhesive layer, the double-woven fabric layer containing PTFE fibers and fibers with higher tensile strength than that of the PTFE fibers, and the PTFE fibers being arranged on sides of the sliding surfaces of the upper and lower shoes,
a fluorine coat layer is disposed on a surface of the double-woven fabric layer, and a lubricating oil layer is disposed on a surface of the fluorine coat layer, and
the double-woven fabric layer, the fluorine coat layer, and the lubricating oil layer are layered in this order.

2. The sliding seismic isolation device according to claim 1, wherein the lubricating oil layer is a silicone oil layer.

3. The sliding seismic isolation device according to claim 2, wherein the kinetic viscosity of the lubricating oil at 25 degrees C. of the lubricating oil layer is equal to or less than 1000 mm2/sec.

4. The sliding seismic isolation device according to claim 1, wherein the fibers with higher tensile strength than that of the PTFE fibers are PPS fibers.

5. The sliding seismic isolation device according to claim 2, wherein the fibers with higher tensile strength than that of the PTFE fibers are PPS fibers.

* * * * *